N. PROSTLER.
METHOD OF UNITING SHEETS OF BRASS, ALUMINIUM, AND OTHER METALS OR ALLOYS OF HIGH CONDUCTIVITY FOR HEAT.
APPLICATION FILED SEPT. 19, 1914.
1,134,007.
Patented Mar. 30, 1915.
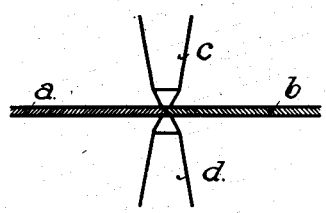
Fig. 1.
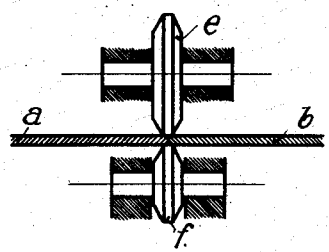
Fig. 2.
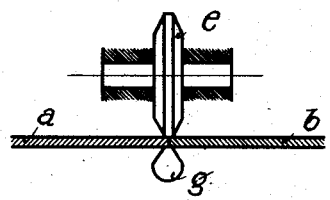
Fig. 3.
Witnesses:
Inventor:
Norbert Pröstler
By 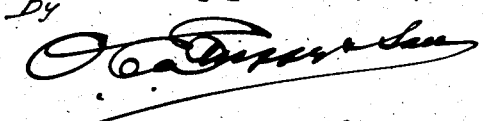
Attorneys

UNITED STATES PATENT OFFICE.

NORBERT PRÖSTLER, OF BERLIN, GERMANY, ASSIGNOR TO GESELLSCHAFT FÜR ELECTROTECHNISCHE INDUSTRIE MIT BESCHRÄNKTER HAFTUNG, OF BERLIN, GERMANY, A CORPORATION OF GERMANY.

METHOD OF UNITING SHEETS OF BRASS, ALUMINIUM, AND OTHER METALS OR ALLOYS OF HIGH CONDUCTIVITY FOR HEAT.

1,134,007.        Specification of Letters Patent.      Patented Mar. 30, 1915.

Original application filed November 11, 1912, Serial No. 730,737. Divided and this application filed September 19, 1914. Serial No. 862,621.

*To all whom it may concern:*

Be it known that I, NORBERT PRÖSTLER, engineer, a subject of King of Bavaria, residing at Berlin, in the Empire of Germany, have invented a certain new, useful, and Improved Method of Uniting Sheets of Brass, Aluminium, and other Metals or Alloys of High Conductivity for Heat, of which the following is a specification, reference being had therein to the accompanying drawing.

My invention relates to a method of uniting abutting sheets of brass, German silver, aluminium and other metals or alloys of high conductivity for heat, that is of a higher heat conductivity than iron. Now, brass being a typical representative of materials of the above mentioned class, I wish it to be well understood that, when in the following specification and in the claims I shall speak of brass for more simplicity, all other alloys or metals having the same properties as to conductivity for heat will be meant as equivalents for brass.

The present application is a division from a co-pending application filed Nov. 11, 1912, Serial No. 730,737 for an improved method of uniting sheets of brass, aluminium and other metals or alloys of high conductivity for heat.

As is well known, abutting sheets of brass have up to the present been united with the help of special soldering means or fluxes containing zinc, so that the seam or joint was visible as a more or less white or gray line on a yellow ground, and for this reason the sheets united together in this manner or the cylindrical and conical bodies of objects and utensils manufactured with such sheets had in no way the appearance of being made in one single piece of metal.

As far as applicant is aware, all former attempts to unite abutting sheets of brass by electric heating with or without inserting a soldering strip between the meeting edges of the sheets remained without success. Now, as it has been proved by thorough experiments, the problem of welding together abutting sheets of brass, German silver, aluminium and other metals or alloys of a high conductivity for heat is completely solved by the method or process forming the object of the present invention.

This method or process of uniting or fastening together two sheets of brass and the like consists in abutting together the lateral edges of said two sheets, exerting perpendicularly to the outer flat surface or plane of said sheets a pressure at the place where said sheets meet together, and in the direction of pressure passing an electric current sufficient to fuse or melt together the abutting edges of said sheets. The current must be of sufficient amount and the pressure adequate as the effect is essentially due to the current used in combination with the pressure applied, so that the metal is melted at the place of welding and the abutting edges fused together, while some melted metal is also forced by the pressing action between the abutting metallic edges so as to make the joint or seam more perfect. As a matter of fact the contacting pieces of metal in the present process are melted or fused together rather than welded according to the real meaning of this word. Consequently, the present new process may be more properly termed a process of fusing or melting together metals than a welding process proper.

Practically I use according to my process a pressure much smaller than the pressure usual for welding iron and a stronger current is needed than in welding iron. The process or method may be performed with the help of the usual point or spot welding electrodes or by using electrode-rollers by which the pressure on the sheets is applied transversely to the direction of the abutting edges of the sheets.

In the accompanying drawing forming a part of this specification Figure 1 represents the uniting of two sheets of brass or equivalent material with abutting lateral edges by means of point electrodes. Fig. 2 illustrates the uniting of two sheets of brass or equivalent material abutting with their lateral edges by means of two electrode-rollers. Fig. 3 shows the uniting of two sheets of brass or equivalent material with abutting lateral edges by means of an upper electrode-roller and a lower rod-shaped electrode.

In Fig. 1 a, b are the abutting sheets of brass or equivalent material; c, d point or spot welding electrodes of usual construction, each point electrode contacting partly with the edge of the sheet a and partly with the edge of the sheet b.

If continuous seams are to be obtained, the brass sheets to be united are brought in abutting or meeting condition between two electrode-rollers e, f (Fig. 2) so that each roller-electrode contacts partly with the edge of the sheet a and partly with the edge of the sheet b, and the required relatively small electrode pressure is applied and maintained perpendicularly and transversely to the outer flat surface of the work-pieces a, b, while causing the electric current to pass across said parts which meet or abut together.

It will be easily understood that the transverse application of pressure referred to may be obtained in a manner familiar to the person skilled in the art either by shifting the work-pieces relatively to the electrode-rollers or by correspondingly moving the electrode-rollers upon the surface of the metal sheets.

In carrying out this process the electrode pressure should not exceed 30 kilograms (about 66 lbs.), while for the uniting of sheets of 0.5 mm. thickness an electrode pressure of 10–15 kilograms (about 22–33 lbs.) is preferable, it being of course understood that the actual electrode pressure is to be governed by the thickness of the sheets to be united.

In Fig. 3 the mode of operation and effect is the same as in Fig. 2 with the only difference that an upper electrode-roller e and a lower rod-shaped electrode g are provided for performing the fusing process.

For a proper understanding of this present method it must be clearly appreciated that the action of brass and similar metals or alloys under high temperatures is quite different from the action of steel and iron, in that the latter assume a plastic condition before becoming liquid under the influence of high temperatures. In the welding of steel and iron by what is known as the spot welding process, the resistance of the steel or iron to the passage of the electric current therethrough generates sufficient heat in the steel or iron to bring them to a plastic condition, at which time the pressure from the electrodes welds or unites the plates. In the case of brass and similar metals or alloys however, there is no intermediate or plastic stage of the metal before it reaches a liquid condition, and brass is similar in this respect to lead, in that it is either solid or liquid, and when solid is turned into a liquid condition under the influence of high temperature without first passing through a plastic condition, as is a characteristic of steel and iron. With a proper understanding of this fundamental difference between the action of steel and iron on the one hand and brass and similar metals or alloys on the other, it will be understood that the same process which can be successfully employed for the welding of sheets of steel and iron electrically, as by the spot welding process, can not be employed for the uniting of brass and similar metals or alloys electrically and that the difference in the method employed for the uniting of thin sheets of brass and similar metals or alloys is not a difference of degree, but is essentially a difference of kind or character of the method or process itself, as will be clearly understood from the following.

In the uniting of thin sheets of brass and similar metals or alloys it is essential that the adjacent faces of the sheets in contact with the electrodes be raised to a sufficiently high temperature to become liquid and melt together to produce a joining or union of the plates, and it is equally essential that the body, or more properly, the interior portion of the plates just adjacent the abutting edges thereof be not raised to a sufficiently high temperature to become liquefied, for if such a liquefied condition exists in the interior of the plates between the electrodes, any appreciable pressure of the electrodes on the plates would instantly displace the liquid metal between the electrodes and result in a hole or aperture through the plates instead of a uniting or joining of the same. It must be therefore understood that in order to effect the joining or uniting of thin sheets of brass or the like the temperature of the surface contacting with the electrodes must be raised to a temperature exceeding that of the temperature of the interior of the plates between the electrodes. Such a condition is brought about by this present process, in that the application of a relatively light pressure of the electrodes on the plates causes what might be termed a slight contact or what is technically called a "poor" contact between the electrodes and the plates. This slight contact offers a greater resistance to the passage of the current at the points of contact and localizes the heat generated by said greater resistance at these contacting surfaces of the plates with the electrodes, while the body or interior of the plates offers less resistance to the passage of the current and consequently the said body or interior of the plates is not raised to the same high temperature as the lightly contacting surfaces. The effect therefore on the plates upon application of a relatively light pressure is that the heat generated by the resistance to the passage of the current at these contacting surfaces being greater than the heat generated in the interior of the plates themselves causes a localized liquefaction of the plates at these contacting surfaces without causing a liquefaction of the metal in the interior of the plates, and adjacent to the contacting surfaces thereof between the electrodes. The effect of this is that the plates are melted rather than welded together, which melting is localized at the contacting surfaces of the plates and the electrodes. As a consequence of this a high pressure of the electrodes on brass plates or the like results in no weld or melting of the metal, as whenever the contact between the surfaces of the plates and the electrodes is so intimate as not to offer the proper resistance to the passage of the current to the contacting surfaces, sufficient heat is not generated to cause a melting of the metal. While on the other hand if the current be of such character to cause a melting of the metal under an intimate contact and high pressure of the electrodes, said melting occurs not only at the contacting surfaces of the plates and the electrodes, but in the interior of the plates themselves between the electrodes. The pressure of the electrodes instantly displaces the fluid metal and produces a hole in the plates instead of a union or joining of the same.

From the foregoing it will be seen that the purpose of this present method is really to maintain the plates of brass or like metal or alloy at a sufficiently light contact with the electrodes to produce a melting temperature at the contacting surfaces only and at the same time maintain the interior of the plates at less than a melting temperature.

As distinguishing this method from the method of welding steel and iron electrically it will be understood that it is by no means essential in the welding of steel and iron to treat the same so that the contacting surfaces thereof are at a higher temperature than the interior of the plates between the electrodes, as the heat generated in steel or iron plates is due entirely to the resistance to the passage of current through the steel or iron plates themselves and not to the resistance to the passage of the current at the actual contacting surfaces of the steel and iron plates with the electrodes.

I claim:

1. The hereinbefore described process of uniting together thin sheets of metals of a higher conductivity for heat than iron, such as brass and like metals or alloys, consisting in abutting together said metallic sheets, exerting perpendicularly to the abutting edges of said sheets an electrode pressure sufficient to produce a slight contact between the plates and the electrodes, and in passing through the plates an electrical current to melt the adjacent contacting surfaces of the sheets.

2. The hereinbefore described process of uniting together thin sheets of metal of a higher conductivity for heat than iron, such as brass and like metals or alloys, consisting in bringing together said metallic sheets by abutting their edges, exerting perpendicularly to the abutting edges of said sheets an electrode pressure sufficient to cause a relatively slight contact between the surfaces of the sheets and the electrodes to provide an increased resistance to the passage of an electrical current between the electrodes and the surfaces of the sheets, and effecting the uniting of the sheets by melting the same at their abutting edges by passing an electric current through the sheets.

3. The hereinbefore described process of uniting together thin sheets of metal of a higher conductivity for heat than iron, such as brass and like metals or alloys, consisting in bringing together said metallic sheets by abutting their edges, exerting transversely to the abutting edges of said sheets an electrode pressure sufficient to produce a slight contact between the plates and the electrodes and in passing through the plates an electrical current to melt the abutting edges of the sheets.

4. The hereinbefore described process of uniting together thin sheets of a metal of a higher conductivity for heat than iron, such as brass and like metals or alloys, consisting in bringing together said metallic sheets by abutting their edges, exerting transversely to the abutting edges of said sheets an electrode pressure sufficient to cause a relatively slight contact between the surfaces of the sheets and the electrodes to provide an increased resistance to the passage of an electrical current between the electrodes and the sheets, and effecting the uniting of the sheets by melting the same at their abutting edges by passing an electric current through the sheets.

5. The herein described process of uniting together thin sheets of brass and like metals or alloys consisting in bringing said sheets together by abutting their edges between two electrodes and applying to the said sheets at the electrodes a pressure sufficient to cause a relatively slight contact between the sheets and the electrodes to provide an increased resistance to the passage of an electrical current at the contacting surfaces of the plates with the electrodes, and in passing an electrical current from one electrode to the other through the plates to cause a localized melting of the metal at the contacting surfaces of the plates with the electrodes which is the point of increase of electrical resistance to melt the abutting edges of the sheets together.

6. The herein described process of uniting together thin sheets of brass and like metals or alloys consisting in abutting together said sheets between two electrodes and in contact therewith, and in maintaining said sheets in a condition of relatively slight contact with the electrodes to produce a greater resistance to the passage of an electrical current at the contacting surfaces of the plates with the electrodes than in the interior thereof, and in passing an electrical current through the plates from one electrode to the other of sufficient strength to cause an increased resistance to the passage of the current at the contacting surfaces of the plates with the electrodes to melt the plates.

7. The herein described process of uniting together thin sheets of brass or like metals or alloys consisting in abutting together said sheets between two electrodes and in contact therewith, and in applying to the said sheets at the point of contact of the electrodes with the said sheets a slight pressure so as to produce a relatively slight contact between the said sheets and the electrodes, and in passing an electrical current through the said sheets from one electrode to the other to produce a localized melting of the sheets at their point of contact with the said electrodes.

In testimony whereof I affix my signature in presence of two witnesses.

NORBERT PRÖSTLER.

Witnesses:
HENRY HASPER,
WOLDEMAR HAUPT.